United States Patent
Kamdar (10) Patent No.: US 10,077,988 B2
(45) Date of Patent: Sep. 18, 2018

(54) SYSTEMS AND METHODS RELATING TO AD/CONTENT TARGETING FOR MAP ROUTE OPTIONS BASED ON PERSONALIZATION AND USER DATA

(71) Applicant: Yahoo! Inc., Sunnyvale, CA (US)

(72) Inventor: Gaurav Kamdar, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 214 days.

(21) Appl. No.: 13/736,625

(22) Filed: Jan. 8, 2013

(65) Prior Publication Data

US 2014/0195154 A1    Jul. 10, 2014

(51) Int. Cl.
  *G01C 21/34*    (2006.01)
  *G06Q 30/02*    (2012.01)

(52) U.S. Cl.
  CPC ..... *G01C 21/3484* (2013.01); *G06Q 30/0269* (2013.01)

(58) Field of Classification Search
  CPC ................. G01C 21/3484; G06Q 30/0269
  USPC ................. 701/533; 705/14.58, 319
  See application file for complete search history.

(56) References Cited

U.S. PATENT DOCUMENTS

| | | | |
|---|---|---|---|
| 6,236,978 B1 * | 5/2001 | Tuzhilin | G06Q 30/018 705/14.25 |
| 7,797,170 B2 | 9/2010 | Bodin | |
| 7,912,630 B2 | 3/2011 | Alewine et al. | |
| 8,027,877 B2 | 9/2011 | Crolley | |
| 2002/0007306 A1 | 1/2002 | Granger et al. | |
| 2008/0082417 A1 * | 4/2008 | Publicover | 705/14 |
| 2009/0005965 A1 * | 1/2009 | Forstall et al. | 701/201 |
| 2010/0088179 A1 * | 4/2010 | Desai | G01C 21/3407 705/14.49 |
| 2010/0106603 A1 | 4/2010 | Dey et al. | |
| 2011/0153193 A1 * | 6/2011 | Fox | G01C 21/20 701/533 |
| 2012/0271713 A1 * | 10/2012 | Nussel et al. | 705/14.53 |
| 2013/0006769 A1 * | 1/2013 | Schalk | G06Q 30/0266 705/14.54 |
| 2013/0046717 A1 * | 2/2013 | Grigg | G06Q 30/02 706/46 |
| 2013/0218463 A1 * | 8/2013 | Howard et al. | 701/533 |
| 2014/0095216 A1 * | 4/2014 | Radhakrishnan | G06Q 30/0631 705/5 |
| 2014/0156341 A1 * | 6/2014 | Kruk | 705/7.29 |
| 2014/0172571 A1 * | 6/2014 | Fabrikant | G06Q 30/0261 705/14.58 |

* cited by examiner

*Primary Examiner* — Mussa A Shaawat
*Assistant Examiner* — Abdhesh K Jha
(74) *Attorney, Agent, or Firm* — Mauriel Kapouytian Woods LLP; Lana Akopyan; James Woods (57) ABSTRACT

The present invention provides methods and systems for incorporating user information such as a user's errands, tasks, and/or online behavior in determining a preferred route between an origin and a destination using a web map planning service. Potential advertisers can use the user information to target particular users who are traveling near a particular route to give users various options to optimize their travel plans.

20 Claims, 5 Drawing Sheets

SYSTEMS AND METHODS RELATING TO AD/CONTENT TARGETING FOR MAP ROUTE OPTIONS BASED ON PERSONALIZATION AND USER DATA

BACKGROUND

Web mapping service applications used for route planning traditionally utilize a model designed to plan a preferred route between two geographical locations. The user often has the option to select different routes emphasizing certain variables, such as quickest travel time, shortest distance, or most use of highways. Typically, if a user has several locations he/she needs to drive to, several successive destination locations can be inputted for a preferred route to be designed.

However, other forms of information, such as a user's errands, tasks, and/or online behavior, have not been incorporated into route planning. Furthermore, advertisers cannot target users who intend to drive near retail locations which may meet a user's explicit or implicit needs. For example, if a user wishes to accomplish a certain number of tasks and errands in travelling from Point A to Point B, web mapping services would require individual location inputs to determine a preferred route.

There is a need for techniques to allow advertisers to target users based on map route calculations.

SUMMARY

Some embodiments of the invention provide methods and systems which take advantage of user information such as browsing history, tasks, errands, and frequented retailers to determine a preferred route between an origin and destination. This technique is advantageous for both users and potential advertisers. Users are presented with various vendors and merchants to help meet with inventory and service needs. Potential advertisers can, in turn, target users with particular needs and whom intending to travel near their location.

Some embodiments of the invention provide methods and systems for cross referencing various information associated with a particular user to identify his/her interests, needs, and activities to allow relevant advertisers to target a user with more accuracy and specificity. For example, if a user named Sally has recently browsed online for reviews of new TVs, has a history of purchasing Sony products on Amazon, and has a recent Facebook post indicating her interest in LED televisions, merchants in Sally's area and along a preferred route she is travelling can target Sally's needs and allow Sally to browse and ask questions in person regarding a new Sony LED TV she may potentially be interested in purchasing.

Some embodiments of the invention provide methods and systems for use in what can be viewed in some ways as "watching" over a user's browsing history. Some embodiments include monitoring and assessing sentiment of users associated with one or more Web-based activities or communications of a user. Activities and communications can include messaging of the user and other users, such as through one or more social networking applications. Furthermore, information or services are provided to the user in connection with the assessed sentiment. For example, some embodiments include assessing sentiment of other users or a group of other users, such as emotional sentiment, perception or opinion, in reaction to one or more activities or communications of the user. Some embodiments include monitoring activities or communications of particular users or groups of users, such as family or friends of the user, users in social groups or communities of the user or of particular importance to the user, etc. Reporting, including a rating or measure of this sentiment, may be provided to the user. Ratings may be based in part on weighting or other input provided from the user. Furthermore, a user may be alerted, or action may be taken, such as pulling down, deleting or disabling certain messages, etc., if, for example, unforeseen or negative sentiment reaches or exceeds a designated threshold.

In some embodiments, information other than information reflecting activity or communications of the user may also be collected as part of the user's information. This could include, for example, other users' comments in response to, or otherwise associated with, a comment of the user, or still other users' comments in response to those users' comments, etc. Some such information may be tracked via logins, but some may not require logins.

Furthermore, in some embodiments, information other than information associated, directly or indirectly, with activities or communications of the user can none the less be considered part of the user's information, and can be collected and made searchable. This can include, for example, information associated with activities and communications of other users who may be associated with or important to the user, such as the user's immediate family, extended family, friends, users in the user's social groups or community, etc. In some embodiments, information collected as part of the user's world can be defined or bounded in different ways, with different degrees and types of breadth. In some embodiments, such coverage may be definable, configurable or partially configurable by the user.

While the invention is described with reference to the above drawings, the drawings are intended to be illustrative, and the invention contemplates other embodiments within the spirit of the invention.

DETAILED DESCRIPTION

Figure 1:
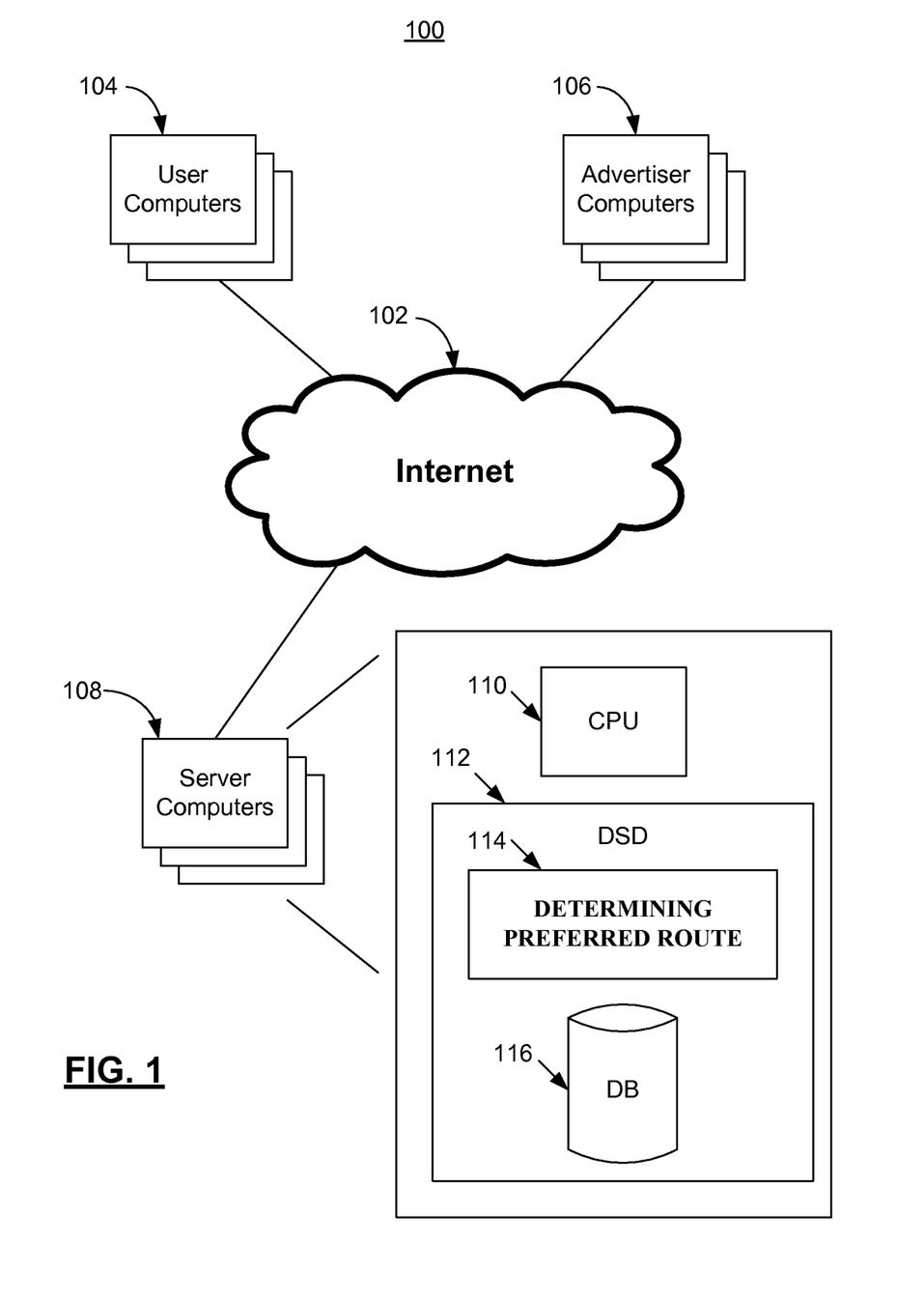
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Determining Preferred Route Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
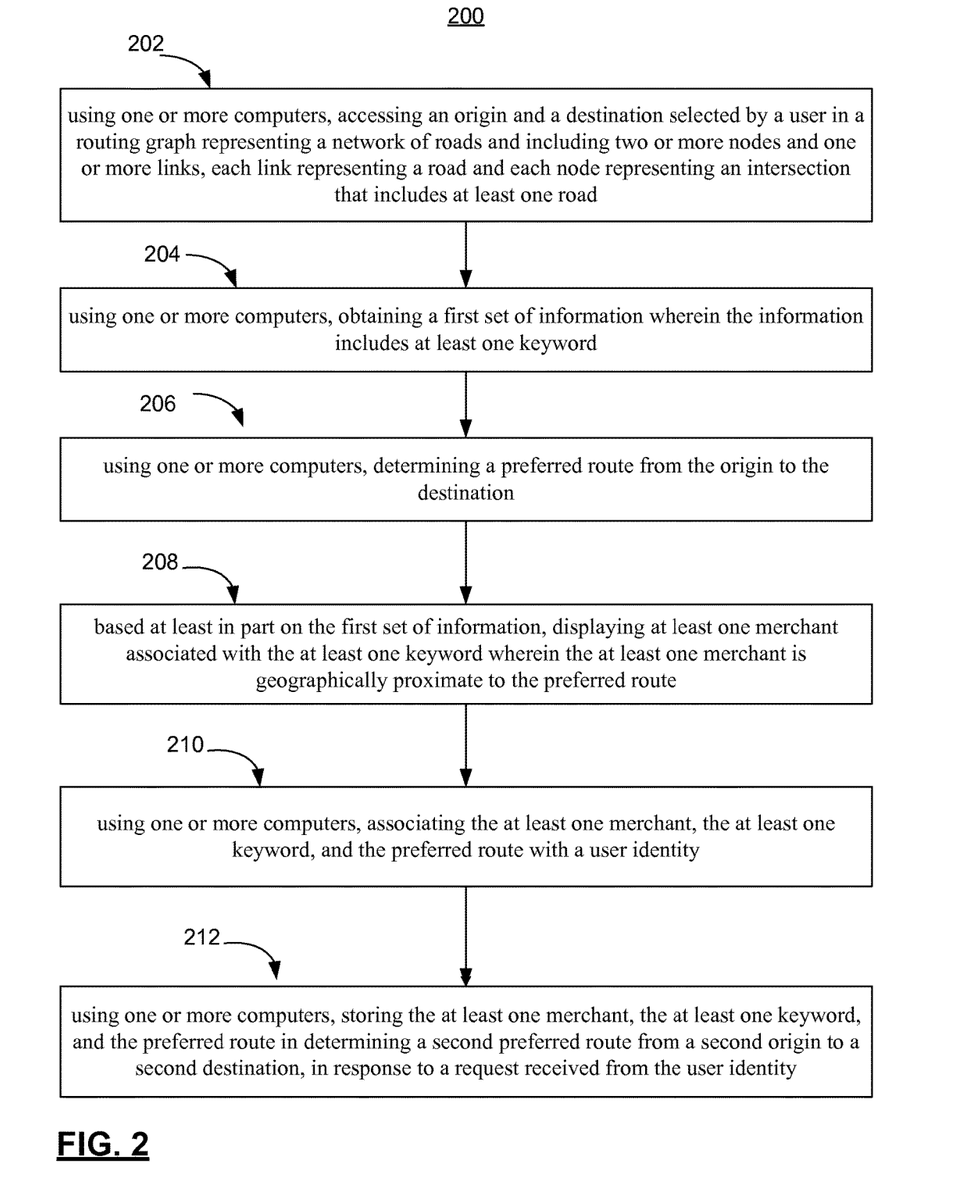
FIG. 2 is a flow diagram illustrating a method according to one embodiment of the invention.

FIG. 2 is a flow diagram of a method 200 according to one embodiment of the invention. At step 202, using one or more computers, an origin and a destination are selected by a user in a routing graph representing a network of roads and including two or more nodes and one or more links, each link representing a road and each node representing an intersection that includes at least one road.

At step 204, using one or more computers, a first set of information is obtained wherein the information includes at least one keyword At step 206, using one or more computers, a preferred route is determined from the origin to the destination.

At step 208, based at least in part on the first set of information, at least one merchant associated with the at least one keyword is displayed wherein the at least one merchant is geographically proximate to the preferred route.

At step 210, using one or more computers, the at least one merchant, the at least one keyword, and the preferred route are associated with a user identity At step 212, using one or more computers, the at least one merchant, the at least one keyword, and the preferred route are stored for subsequent use in determining a second preferred route from a second origin to a second destination, in response to a request received from the user identity.

Figure 3:
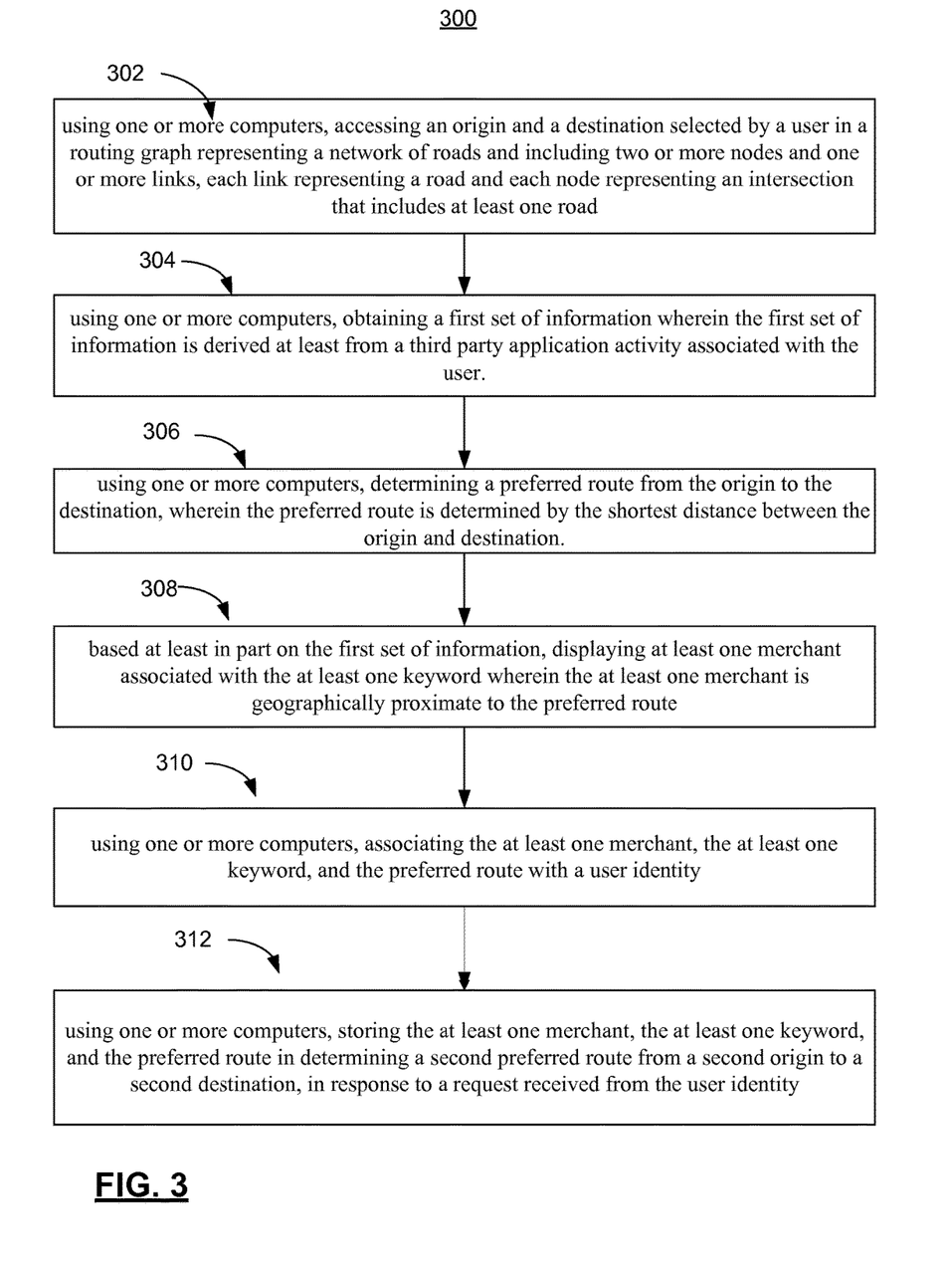
FIG. 3 is a flow diagram illustrating a method according to one embodiment of the invention.

FIG. 3 is a flow diagram illustrating a method 300 according to one embodiment of the invention. At step 302, using one or more computers, an origin and a destination are selected by a user in a routing graph representing a network of roads and including two or more nodes and one or more links, each link representing a road and each node representing an intersection that includes at least one road. At step 304, using one or more computers, a first set of information is obtained wherein the first set of information is derived at least from a third party application activity associated with the user.

At step 306, using one or more computers, a preferred route is determined from the origin to the destination, wherein the preferred route is determined by the shortest distance between the origin and destination.

At step 308, based at least in part on the first set of information, at least one merchant associated with the at least one keyword is displayed wherein the at least one merchant is geographically proximate to the preferred route.

At step 310, using one or more computers, the at least one merchant, the at least one keyword, and the preferred route are associated with a user identity At step 312, using one or more computers, the at least one merchant, the at least one keyword, and the preferred route are stored for subsequent use in determining a second preferred route from a second origin to a second destination, in response to a request received from the user identity.

Figure 4:
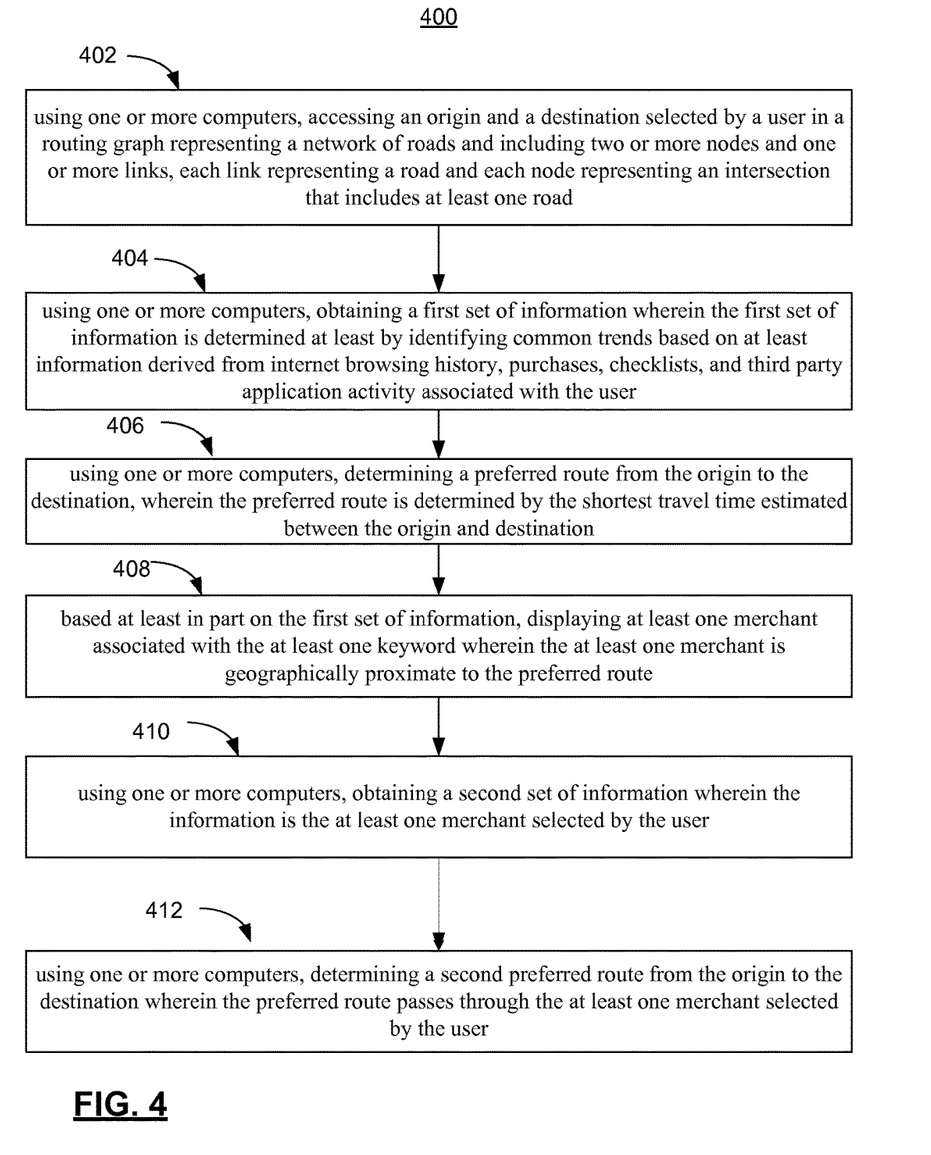
FIG. 4 is a flow diagram illustrating a method according to one embodiment of the invention.

FIG. 4 is a flow diagram illustrating a method 400 according to one embodiment of the invention. At step 402 using one or more computers, an origin and a destination are selected by a user in a routing graph representing a network of roads and including two or more nodes and one or more links, each link representing a road and each node representing an intersection that includes at least one road. At step 404, using one or more computers, a first set of information is obtained wherein the first set of information is determined at least by identifying common trends based on at least information derived from internet browsing history, purchases, checklists, and third party application activity associated with the user.

At step 406, using one or more computers, a preferred route is determined from the origin to the destination, wherein the preferred route is determined by the shortest travel time estimated between the origin and destination.

At step 408, based at least in part on the first set of information, at least one merchant associated with the at least one keyword is displayed wherein the at least one merchant is geographically proximate to the preferred route.

At step 410, using one or more computers, a second set of information is obtained wherein the information is the at least one merchant selected by the user.

Figure 5:
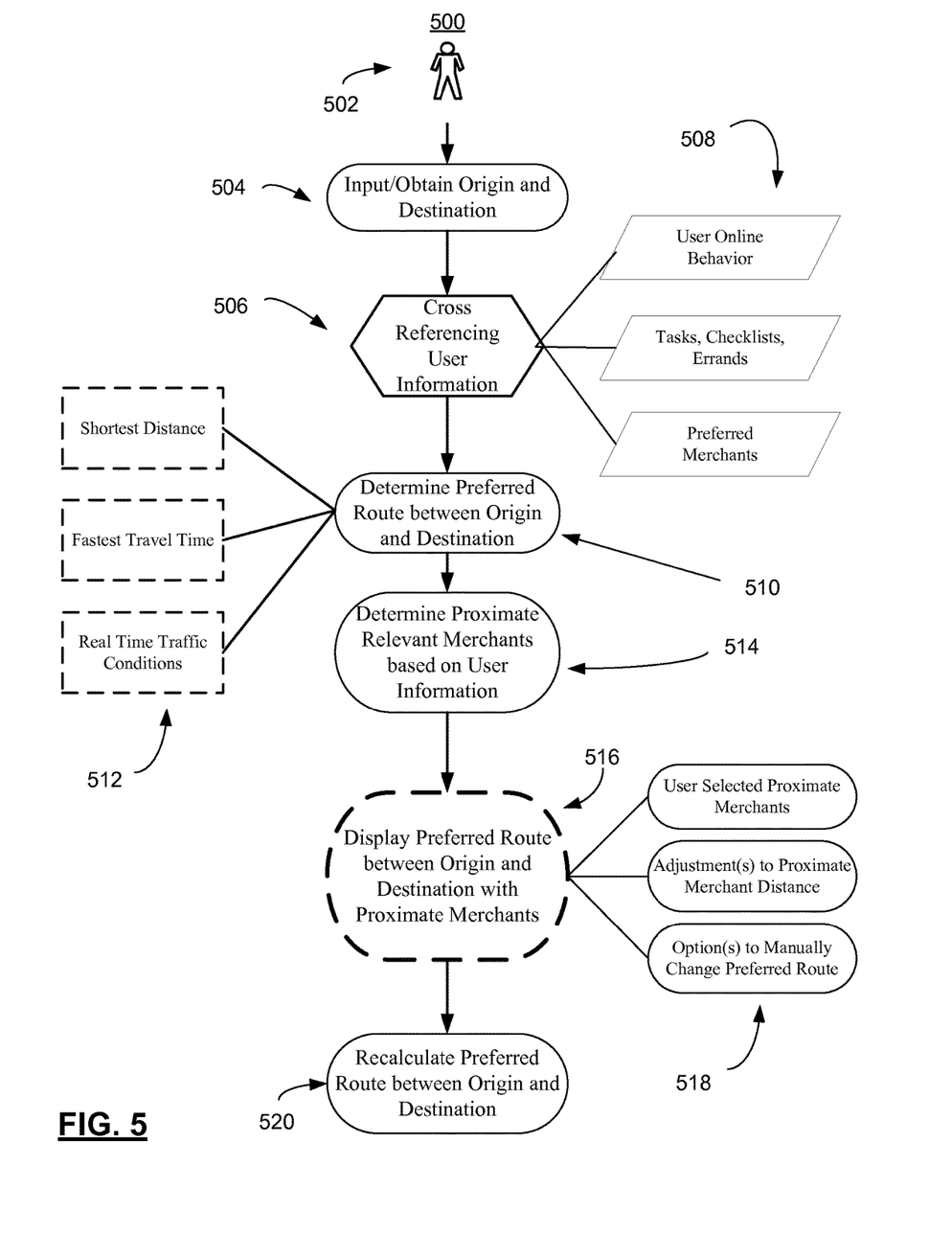
FIG. 5 is a flow diagram illustrating a method according to one embodiment of the invention.

At step 412, using one or more computers, a second preferred route is determined from the origin to the destination wherein the preferred route passes through the at least one merchant selected by the user FIG. 5 is a flow diagram illustrating a method 500 according to one embodiment of the invention.

At step 502, a user is assessed. At step 504, an origin and a destination are selected by a user in a routing graph representing a network of roads and including two or more nodes and one or more links, each link representing a road and each node representing an intersection that includes at least one road. At step 506, a first set of user information 508 is obtained wherein the first set of information 508 is derived from sources including user online behavior, tasks, checklists, errands, and preferred merchants the user has previously used.

At step 510, a preferred route is determined from the origin to the destination, wherein the preferred route is determined by various user-selected parameters 512 including shortest distance, fastest travel time, and real time traffic conditions.

At step 514, based at least in part on determining the preferred route 510 and the cross referencing of user information 506, proximate merchants relevant to the particular 514. These proximate relevant merchants are displayed 516 between the origin and destination. Subsequent user inputs 518 including user selected proximate merchants, adjustment(s) made to distance settings used to determine proximate merchants, and the user manually changing the preferred route are utilized to recalculate the preferred route between the origin and destination 520.

While the invention is described with reference to the above drawings, the drawings are intended to be illustrative, and the invention contemplates other embodiments within the spirit of the invention.

The invention claimed is:

1. A system comprising one or more processors and a non-transitory storage medium comprising program logic for execution by the one or more processors, the program logic comprising:
   a mapping service programming module configured to:
      receive a user-specified origin and a user-specified destination in a routing graph representing a network of roads of a Web-based mapping service including whether a user wishes to accomplish a certain number of tasks and errands while traveling from the user-specified origin and the user-specified destination;
      determine a first travel route from the user-specified origin to the user-specified destination;
      display the first travel route to the user within the routing graph; and
      receive user-specified adjustments to user-selected parameters via user input to the routing graph including distance settings, travel time settings, and real time traffic condition settings in the routing graph of a Web-based mapping service;
   a merchant display and selection programming module configured to:
      identify one or more common trends of internet browsing associated with the user based on collected information derived at least from internet activity associated with the user, the internet activity including one or more internet tasks, checklists and errands of the user, and at least one previously performed third-party Web-based application activity associated with the user, the at least one previously performed third-party Web-based application activity including an activity by the user at a Web-based application of a preferred merchant proximate to the first travel route that the user has been determined to have previously selected and used;
      determine a set of proximate and relevant merchants that are geographically proximate to the first travel route based at least in part to the distance settings and are determined to have relevance to the user based on at least the one or more identified common trends;
      display, to the user, within the routing graph representing a network of roads in connection with the first travel route and together with the first travel route already displayed in the routing graph, the set of proximate and relevant merchants in the routing graph, the relevant merchant being selectable by the user in the routing graph and displayed between the origin and the destination and geographically proximate to the preferred route; and
      allow subsequent user input to the routing graph including selection by the user intending to travel near the merchants of one or more merchants of the displayed set of proximate and relevant merchants by a user selection within the routing graph; and
   a travel route customization programming module that, based at least in part on the selection, is configured to:
      store for subsequent use and associated with a user identity related to the user, the first travel route along with the selected one or more merchants and a keyword;
      determine a second travel route, based in part on the user-specified adjustments, from the user-specified origin to the user-specified destination, such that the selected one or more merchants are along the second travel route; and
      display the second travel route to the user by updating the routing graph to display the second travel route including the selected one or more merchants displayed along the second travel route.

2. The system of claim 1, wherein the collected information includes information regarding online behavior of the user.

3. The system of claim 1, wherein the collected information includes information on historical Web browsing activity of the user.

4. The system of claim 1, wherein the collected information includes information on historical Web browsing activity of the user, and wherein determining the set of proximate and relevant merchants comprises:
   based at least in part on the Web browsing activity of the user, determining one or more keywords; and
   using the one or more keywords in determining the set of proximate and relevant merchants.

5. The system of claim 1, wherein the collected information includes information on social networking related activity of the user, information on purchases of the user, and information on errands of the user.

6. The system of claim 1, wherein the collected information includes information on social networking activity of users in a group of users to which the user belongs.

7. The system of claim 1, wherein the collected information includes information on social networking activity including ratings of the user and assessed sentiment of the user.

8. The system of claim 1, wherein the collected information includes information on social networking activity including ratings and assessed sentiment of users in a group of users to which the user belongs.

9. The system of claim 1, further comprising a merchant targeting programming module that allows a merchant, of the set of proximate and relevant merchants, to target the user with one or more content items or advertisements.

10. The system of claim 1, further comprising a merchant targeting programming module that allows a merchant, of the set of proximate and relevant merchants, to target the user with one or more content items or advertisements based at least in part on the collected information associated with the user.

11. The system of claim 1, further comprising a merchant targeting programming module that allows a merchant, of the set of proximate and relevant merchants, to target the user with one or more content items or advertisements based at least in part on the collected information associated with the user and on the merchant being along the second travel route.

12. The system of claim 1, wherein the first travel route and the second travel route are provided to the user on a portable electronic device of the user.

13. A method comprising:
   receiving a user-specified origin and a user-specified destination in a routing graph representing a network of roads of a Web-based mapping service including whether a user wishes to accomplish a certain number of tasks and errands while traveling from the user-specified origin and the user-specified destination;
   determining a first travel route from the user-specified origin to the user-specified destination;

displaying the first travel route to the user within the routing graph;

receiving user-specified adjustments to user-selected parameters via user input to the routing graph including distance settings, travel time settings, and real time traffic condition settings in the routing graph of a Web-based mapping service;

identifying one or more common trends of internet browsing associated with the user based on collected information derived at least from internet activity associated with the user, the internet activity including one or more internet tasks, checklists and errands of the user, and at least one previously performed third-party Web-based application activity associated with the user, the at least one previously performed third-party Web-based application activity including an activity by the user at a Web-based application of a preferred merchant proximate to the first travel route that the user has been determined to have previously selected and used;

determining a set of proximate and relevant merchants that are geographically proximate to the first travel route based at least in part to the distance settings and are determined to have relevance to the user based at least in part on the one or more identified common trends;

displaying, to the user, within the routing graph representing a network of roads in connection with the first travel route and together with the first travel route already displayed in the routing graph, the set of proximate and relevant merchants in the routing graph, the relevant merchant being selectable by the user in the routing graph and displayed between the origin and the destination and geographically proximate to the preferred route;

allowing subsequent user input to the routing graph including selection by the user of one or more merchants of the displayed set of proximate and relevant merchants, by a user selection within the routing graph;

storing for subsequent use and associated with a user identity related to the user, the first travel route along with the selected one or more merchants and a keyword;

based at least in part on the selection and the user-specified adjustments, determining a second travel route, from the user-specified origin to the user-specified destination, such that the selected one or more merchants are along the second travel route;

displaying the second travel route to the user by updating the routing graph to display the second travel route including the selected one or more merchants displayed along the second travel route; and allowing a merchant, of the selected one or more merchants, to target the user intending to travel near the merchant with one or more content items or advertisements, based at least in part on the collected information associated with the user and on the merchant being along the second travel route.

14. The method of claim 13, wherein the collected information includes Web browsing activity of the user.

15. The method of claim 13, and wherein determining the set of proximate and relevant merchants comprises:
based at least in part on the Web browsing activity of the user, determining one or more keywords; and
using the one or more keywords in determining the set of proximate and relevant merchants.

16. The method of claim 13, wherein the collected information includes social networking related activity of the user, information on purchases of the user, and information on errands of the user.

17. The method of claim 13, wherein the collected information includes social networking activity of users in a group of users to which the user belongs.

18. The method of claim 13, wherein the collected information includes social networking activity including ratings and assessed sentiment of users in a group of users to which the user belongs.

19. A non-transitory computer readable storage medium or media tangibly storing computer program logic capable of being executed by a computer processor, the program logic comprising:

mapping service programming logic configured to:
receive a user-specified origin and a user-specified destination in a routing graph representing a network of roads of a Web-based mapping service including whether a user wishes to accomplish a certain number of tasks and errands while traveling from the user-specified origin and the user-specified destination;
determine a first travel route from the user-specified origin to the user-specified destination;
display the first travel route to the user within the routing graph; and
receive user-specified adjustments to user-selected parameters via user input to the routing graph including distance settings, travel time settings, and real time traffic condition settings in the routing graph of a Web-based mapping service;

merchant display and selection programming logic configured to:
identify one or more common trends of internet browsing associated with the user based on collected information derived at least from internet activity associated with the user, the internet activity including one or more internet tasks, checklists and errands of the user, and at least one previously performed third-party Web-based application activity associated with the user, the at least one previously performed third-party Web-based application activity including an activity by the user at a Web-based application of a preferred merchant proximate to the first travel route that the user has been determined to have previously selected and used;
determine a set of proximate and relevant merchants that are geographically proximate to the first travel route based at least in part to the distance settings and are determined to have relevance to the user based on at least the one or more identified common trends;
display, to the user, within the routing graph representing a network of roads in connection with the first travel route and together with the first travel route already displayed in the routing graph, the set of proximate and relevant merchants in the routing graph, the relevant merchant being selectable by the user in the routing graph and displayed between the origin and the destination and geographically proximate to the preferred route; and
allow subsequent user input to the routing graph including selection by the user intending to travel near the merchants of one or more merchants of the displayed set of proximate and relevant merchants by a user selection within the routing graph; and travel route customization programming logic configured to:
- store for subsequent use, the first travel route along with the selected one or more merchants and a keyword;
- based at least in part on the selection and the user-specified adjustments, determine a second travel route, from the user-specified origin to the user-specified destination, such that the selected one or more merchants are along the second travel route; and
- display the second travel route to the user by updating the routing graph to display the second travel route including the selected one or more merchants displayed along the second travel route.

20. The non-transitory computer readable storage medium or media of claim 19, further comprising:
- merchant targeting programming logic that allows a merchant, of the selected one or more merchants, to target the user with one or more content items or advertisements, based at least in part on the collected information associated with the user and on the merchant being along the second travel route.

\* \* \* \* \*